Sept. 11, 1951     H. DE BREY ET AL     2,567,637
HOT GAS PISTON APPARATUS WITH FLEXIBLE CRANK COUPLING
Filed Jan. 21, 1948
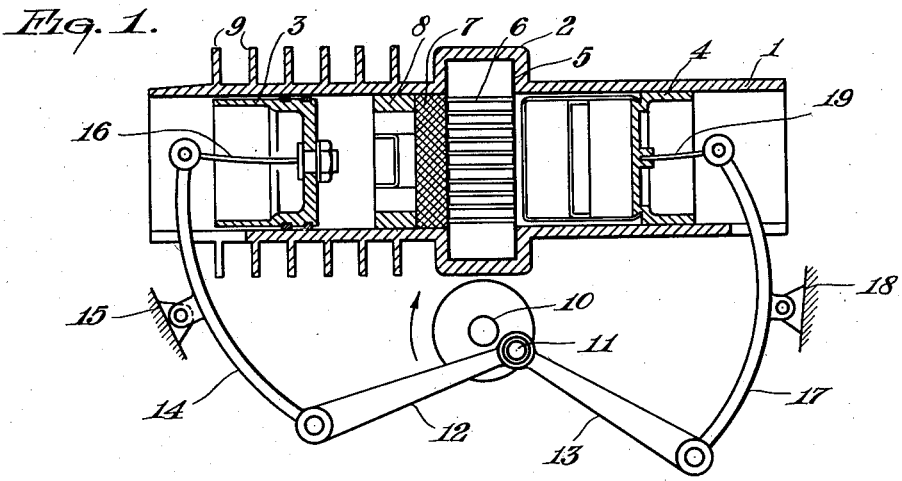
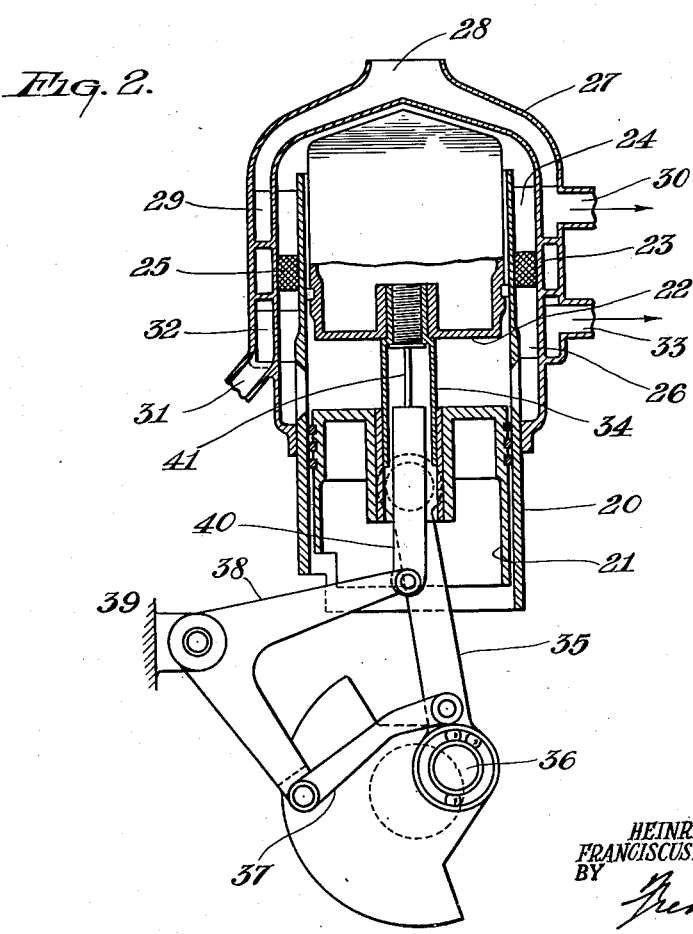
INVENTORS.
HEINRICH DE BREY
FRANCISCUS LAMBERTUS VAN WEENEN.
BY
AGENT.

Patented Sept. 11, 1951

2,567,637

UNITED STATES PATENT OFFICE 2,567,637

HOT GAS PISTON APPARATUS WITH FLEXIBLE CRANK COUPLING

Heinrich de Brey and Franciscus Lambertus van Weenen, Eindhoven, Netherlands, assignors to Hartford National Bank and Trust Company, Hartford, Conn., as trustee Application January 21, 1948, Serial No. 3,503
In the Netherlands January 31, 1947

2 Claims. (Cl. 60—24)

As is well-known hot-gas piston engines, for instance hot-gas engines and refrigerators operating according to the reversed hot-gas engine principle, may be constructed in such manner that a complete cycle occurs in one cylinder. In accordance with the required mechanical power or caloric capacity a plurality of these cylinders, jointly constituting one engine, may then be used.

Two piston-shaped members move in such a cylinder.

The movements of the two piston-shaped members are, when represented by a graph composed of the crank angles and the distances travelled substantially sinusoidal, but in order that operation of the hot-gas piston engine be possible, there should be a certain phase-displacement between the two movements.

In general the two movements will be deduced from one point in order to simplify the construction of the engine. This means that a system of coupling elements is required between this point and at least one of the piston-shaped members. If the point, from which the movement of the piston-shaped members is derived, lies on the centre line of the cylinder, one driving rod between this point and the working piston is sufficient, but there should be provided a system of coupling elements between the said point and, for instance, the displacer in order to ensure the required phase-displacement.

If the point from which the movement of the piston-shaped members is derived, lies beyond the centre line of the cylinder, two systems of coupling elements are generally required for connecting the two piston-shaped members to the said point.

Such a system of coupling elements exhibits many pivoted points all of which require lubrication and may be a source of frictional losses; moreover wear and tear occurs. It may be vital to eliminate these frictional losses and wear and tear as much as possible and one of the means which may be used therefor consists in reducing the number of pivoted points.

According to the invention, in a hot-gas piston engine comprising one or more cylinders, in each of which two piston-shaped members are movable and the movement of one of the piston-shaped members differs in phase with respect to the other, the coupling element of the system of coupling elements connecting one or both piston-shaped members in each cylinder to the point by which the movements are determined, which coupling element is secured to the piston-shaped member, is resilient in one direction. The construction according to the invention permits one pivoted point to be eliminated and more particularly the pivoted point which is least accessible and most difficult to lubricate.

Preferably, according to the invention, one of the piston-shaped members is a working piston and the other a displacer, the working piston being connected to a crank through a driving rod, and the displacer being connected, through a system of coupling elements, to the driving rod of which the coupling element secured to the displacer is resilient in one direction.

In a particularly suitable form of construction of the invention the resilient element consists of a plate spring.

In order that the invention may be more clearly understood and readily carried into effect, it will now be described more fully with reference to the accompanying drawing, given by way of example, in which Figures 1 and 2 represent embodiments thereof.

Fig. 1 shows a hot-gas piston machine which is constructed as a hot-gas engine. The numeral 1 designates a cylinder having a part 2 of larger diameter. Two piston-shaped members 3 and 4 are movable in the said cylinder 1. The part 2 contains a box-shaped member 5 of which the two ends are connected through a large number of pipes 6. In a manner not further indicated these pipes 6 are heated, for instance by leading hot gasses around them. Furthermore, the cylinder 1 contains a regenerator 7 and a cooler 8. Finally the cylinder 1 comprises cooling ribs 9 along which a cooling medium circulates e. g. air.

The shaft 10 driven by the hot-gas engine comprises a crank 11 to which two coupling elements 12 and 13 are connected. By means of a lever 14 pivoting about a fixed point 15 the coupling element 12 is connected to a coupling element 16 which, according to the invention, is resilient in one direction and connected to the piston 3. In this manner the unfavourably located pivoted point of the piston 3 can be dispensed with.

On the other hand the coupling element 13 is connected, through a lever 17 pivoting about a fixed point 18, to a coupling element 19 which, likewise according to the invention, consists of a plate spring, of which one hand is hinged to the lever 17 and the other end rigidly secured to the piston 4. In carrying out the invention in this way the pivoted point at the piston 4, which is otherwise necessary, can be dispensed with.

Since the movements of the pistons 3 and 4 are derived from one point i. e. the crank 11, there will be a certain phase-displacement between the movements, the piston 4 leading with respect to the piston 3 in the indicated direction of rotation.

In the hot-gas piston machine shown in Fig. 2, which is likewise constructed as a hot-gas engine, the reference numeral 20 designates a cylinder in which a working piston 21 and a displacer 22 are movable. The upper part of the cylinder 20 is surrounded by an envelope 23. Heating elements 24, a regenerator 25 and cooling elements 26 are housed in the cylindrical space between the cylinder 20 and the envelope 23. The envelope 23 is surrounded by another envelope 27, in the opening 28 of which a burner (which is not further referred to) may be provided. This burner heats the head of the jacket 23, the combustion gases passing along the heating elements 29 and escaping through the aperture 30. A cooling medium, for instance water, passes through an aperture 31 over the cooling ribs 32 and escapes through an aperture 33. The displacer 22 has a straight-line guide 34 in which the working piston 21 is movable, the latter being connected to a crank 36 through the intermediary of a forked driving rod 35. The driving rod 35 is hinged to a lever 37 which, in its turn, is hinged to a coupling element 38 swingably supported at 39. An element 40 is hinged to the coupling element 38. The said element 40 which is connected to the displacer 22, comprises a part 41 which, according to the invention, is resilient in one direction. This use of the invention permits the unfavourably located pivoted point at the displacer 22 to be dispensed with.

What we claim is:

1. A hot-gas piston engine comprising a cylinder, a displacer movable in said cylinder, a working piston movable in said cylinder, said working piston comprising means for rectilinearly guiding the movement of said displacer, said guiding means having slidably mounted therein a hollow shaft means, said shaft means being rigidly connected to said displacer, a crank, a driving rod operatively connecting said working piston to said crank, coupling means connecting said displacer to said driving rod, said coupling means comprising a resilient element which extends through said hollow shaft means in spaced relationship thereto.

2. A hot-gas piston engine comprising a cylinder, a displacer movable in said cylinder, a working piston movable in said cylinder, said working piston comprising bushing means, a crank, a driving rod operatively connecting said working piston to said crank, a hollow shaft rigidly connected to said displacer and slidably mounted in said bushing means, a resilient element connected at one end thereof to said displacer and extending through and beyond said hollow shaft in spaced relationship thereto, and coupling means pivotally connected to said driving rod and to said resilient element at the other end thereof.

HEINRICH DE BREY.
FRANCISCUS LAMBERTUS VAN WEENEN.

REFERENCES CITED

The following references are of record in the file of this patent:

UNITED STATES PATENTS

| Number | Name | Date |
|---|---|---|
| 158,571 | Chandler | Jan. 12, 1875 |
| 1,730,580 | Lundgaard | Oct. 8, 1929 |
| 1,766,024 | Jones | June 24, 1930 |
| 1,927,617 | Schmidt | Sept. 19, 1933 |